United States Patent [19]

Porzel et al.

[11] 4,273,688

[45] * Jun. 16, 1981

[54] WOOD TEXTURED AQUEOUS LATEX CONTAINING WOOD PARTICLES WITH SORBED ORGANIC SOLVENT

[75] Inventors: Rita E. Porzel, Lisle; Cathryn D. Bator, Des Plaines, both of Ill.

[73] Assignee: DeSoto, Inc., Des Plaines, Ill.

[*] Notice: The portion of the term of this patent subsequent to May 13, 1997, has been disclaimed.

[21] Appl. No.: 96,020

[22] Filed: Dec. 3, 1979

Related U.S. Application Data

[63] Continuation-in-part of Ser. No. 941,184, Sep. 11, 1978, Pat. No. 4,202,804.

[51] Int. Cl.$^3$ .......................... C08L 97/02; B29J 5/02
[52] U.S. Cl. .................................................. 260/17.4 R
[58] Field of Search ........................ 260/17.4 R, 42.46

[56] References Cited

U.S. PATENT DOCUMENTS

| | | | |
|---|---|---|---|
| 3,749,692 | 7/1973 | Scoscos | 260/42.46 |
| 4,202,804 | 5/1980 | Porzel et al. | 260/17.4 R |

*Primary Examiner*—Earl A. Nielsen
*Attorney, Agent, or Firm*—Dressler, Goldsmith, Shore, Sutker & Milnamow, Ltd.

[57] ABSTRACT

A viscosity stable, stainable, wood textured, aqueous latex composition comprises from 5% to 30% of the weight of the composition of wood particles having sorbed therein a water immiscible organic solvent in an amount of at least about 60% of the weight of the wood to provide a free-flowing, solvent-wet powder, an aqueous emulsion of film-forming plasticized resin particles coalescable at room temperature or below; the proportion of wood particles, the resin solids content of the aqueous emulsion and the plasticization of the resin particles providing a viscous mass, and the organic solvent sorbed in the wood particles providing viscosity stability.

9 Claims, No Drawings

WOOD TEXTURED AQUEOUS LATEX CONTAINING WOOD PARTICLES WITH SORBED ORGANIC SOLVENT

This application is a continuation-in-part of our prior application Ser. No. 941,184, filed Sept.11, 1978 now U.S. Pat. No. 4,202,804, issued May 13, 1980.

TECHNICAL FIELD

This invention relates to a viscosity stable, stainable aqueous latex textured composition and to the preparation thereof. These latex compositions are particularly useful as caulks, but they can also be used to decorate surfaces, in which case they would be considered paints.

BACKGROUND ART

The incorporation of wood particles into aqueous caulking compositions to provide a stainable material possessing a wood texture has been attempted, but the final caulking compositions were not viscosity stable which is of great importance when the product will be stored for unpredictable periods of time before sale or use. This same difficulty of viscosity instability also characterizes these aqueous compositions when they are trowelled or painted onto surfaces for decorative purposes other than caulking.

DISCLOSURE OF INVENTION

We have found that when wood particles are treated with water immiscible organic solvents to being formulated into an aqueous latex composition, that the resulting wood particle-containing composition will not change its viscosity appreciably on storage as was the case prior ot our invention. Thus, our compositions may be used immediately or after prolonged storage.

In accordance with this invention, the aqueous latex is comprised of wood particles which contain sorbed, water immiscible organic solvent providing a free-flowing, but solvent-wet powder, and an aqueous emulsion of coalescable film-forming resin particles. The resin particles are normally plasticized, preferably with an external plasticizer for the resin particles. The proportion of wood particles, the solids content of the aqueous emulsion and the plasticization of the resin particles provide a viscous mass which can be spread appropriately. The compositions of this invention may be prepared conveniently by combining the free-flowing solvent-wet powder and the aqueous emulsion prior to finally thickening the composition with the oily plasticizer.

The wood particles used in this invention are commercially available and may be made from mixed woods. We have found wood flours made from hardwoods with a particle size in the range of 149-590 microns to be particularly preferred, however, wood flours whose particle size is about 120 microns to about 600 microns are also quite effective. Sawdust from both hard and soft woods, such as hickory and pine, are also effective, as are mixtures of sawdusts from several varieties of woods. Sawdust particle sizes are typically about 250 microns to about 2000 microns. Sawdusts and wood flours may be mixed and used effectively with the particle size of the wood particles determining the coarseness of the final texture. Thus, if a fine textured appearance is desired, small particle sizes such as the preferred about 180 micron particles are desirable, while if a rough texture is desired, sawdust having larger particle sizes up to about 2000 microns may be used.

Several water immiscible organic solvents may be used in this invention, but aliphatic hydrocarbon solvents are preferred. Boiling point ranges from about 130° C. to about 200° C. Preferred solvents of this description are mineral spirits, turpentine and turpentine substitutes, with mineral spirits being most preferred.

To prepare the wood particles for incorporation into the latex composition, the wood particles and organic solvent are simply mixed together with sufficient agitation to insure an even distribution of the solvent on the wood particles. It is convenient to pour the solvent into a container containing the wood particles.

The organic solvent is mixed into wood particles in an amount of at least about 60% by weight, based on the weight of the wood, in order to provide an improvement in viscosity stability. More solvent improves the desired stability, but it is not desired to use so much solvent that the wood cannot sorb it, since then the wood particles would stick together or solvent would separate. In preferred practice, the solvent-wetted wood particles will look dry, but they will be wet to the touch. About 60%-100% of the solvent is used, based on the weight of the wood, most preferably about 70%-80%.

The mechanism by which our invention works is not now fully understood. We have found, however, that when wood particles are incorporated into water-based, emulsion systems without a pretreatment as disclosed herein, large viscosity changes occur on storage. Thus, those compositions which are formulated to what is thought to be a proper viscosity for use in a caulking gun, i.e., a gunable viscosity, after standing or storage prior to consumer use, the resultant caulk is too viscous to be used with a caulking gun or to be tooled as with a trowel like a putty. Conversely, if this increase in viscosity is taken into account, and the viscosity of the formulated composition is made thinner than would normally be used by a consumer, then products of these compositions must be aged and cannot be sold or used before it thickens. Viscosity is of less importance when the composition is applied by trowelling or brushing, but it is still significant, especially when application is by inexperienced persons who cannot adjust viscosity adequately. It is thought that the thickening which occurs on aging without prior pretreatment of the wood particles with an organic solvent occurs as a result of the delayed sorption of water from the aqueous latex component of the composition. The pretreatment of our invention appears to prevent such delayed sorption of water, but the precise mechanism is not clear. The result, however, is that the viscosity remains approximately constant from the time of initial formulation.

We have found that when untreated samples of wood particles are treated with a few drops of water, the water forms droplets upon the surface of the wood particles and required 3 to 4 hours for sorption to take place. When wood flour was treated with 71% by weight of mineral spirits, the water drop test showed water to be sorbed in about 5 to about 10 minutes. Similar tests using the aqueous emulsion of coalescable film-forming resin particles again showed that, with untreated wood particles, sorption of aqueous droplets required 3 to 4 hours, while with wood particles treated as has just been described, sorption occurred almost immediately. Similar tests were run using solvents such as 2-methoxyethanol, 2-butoxyethanol and 2-ethoxyethanol acetate. All of these solvents were sorbed into the wood particles in the proportion just described. Sorption of both water and the just described emulsion occurred almost immediately. Nonetheless, caulk compositions formulated using these three solvents did not exhibit stable viscosities, showing the significance of solvent selection.

The compositions of this invention are aqueous latices in which the latex particles are plasticized to be coalescable at room temperature or below. For paint purposes, a $T_g$ below 15° C. can be used. For caulk purposes, it is preferred to use a $T_g$ below about −40° C. which provides an effective flexible binder at low temperature. The plasticizer may be external or internal. Using an external plasticizer, the resin particles swell to increase viscosity by the sorbtion of the plasticizer. These latices are formed from an aqueous emulsion of coalescable film-forming resin particles which are combined with the above pretreated wood particles, and a plasticizing agent is added to decrease the $T_g$ wherever it is too high. The coalescable film-forming resin particles of these aqueous emulsions are typically acrylic polymers which have a glass transition temperature ($T_g$) low enough to permit coalescence at about 0° C. A $T_g$ of about −5° C. to about −60° C. is preferred. When the $T_g$ of the copolymer is above the desired coalescing temperature, then external plasticizer is added. This added plasticizer functions to enhance the binding capacity and the flexibility of a caulk made from the plasticized copolymer. External plasticizer serves to increase viscosity so, if it is not needed, then some other thickener must be used, such as hydroxyethyl cellulose. Resin particles having $T_g$ values below −40° C. provide caulks which remain rubbery at the low temperatures commonly found during the winter time in the United States. These aqueous emulsions are well known in the art and will not be described at length. They can be provided by copolymers of ethyl acrylate and methyl methacrylate, or by copolymers of vinyl acetate and butyl methacrylate, or by copolymers of vinyl acetate and ethylene. Ethyl hexyl acrylate and ethylene are particularly desirable to provide internal plasticization. A preferred aqueous emulsion for the preparation of caulks in this invention is produced by Rohm and Haas Company under the trademark RHOPLEX LC-40. This emulsion contains about 55% solids of a thermoplastic acrylic polymer having a $T_g$ of about −9° C.

As used in our invention, the aqueous emulsions of coalescable film-forming particles comprise about 35% to about 70% by weight of the total mass of the composition. Preferably, they are used at about 45% to about 60% of the total composition. These emulsions generally contain about 45% to 65% by weight of resin solids, and preferably contain about 56% to about 60% solids.

The wood particles may constitute from 5% to 30% of the weight of the composition, preferably from 10% to 25%.

In compounding the compositions of this invention the pretreated wood particles and aqueous emulsion are mixed prior to the addition of any oily plasticizer which may be needed, or prior to the addition of thickener. In this way intimate mixing is achieved before the composition has the high viscosity needed in the final product. Although we have found it preferable to add the aqueous emulsion of resin particles to the wood particles, the wood particles may be added to the emulsion. In either event, the wood particle-emulsion system is agitated to assure a uniform distribution of wood particles in the emulsion before agents causing thickening are added.

The compositions of this invention frequently contain an oily plasticizer of low volatility. The function of this plasticizer, along with the solids contributed by the wood particles and the emulsion polymer, is to provide flexibility and integrity to the final product and to build the viscosity of the caulk. These plasticizers do not volatilize to any significant extent over the life of the compositions and are therefore regarded as permanent plasticizers. The plasticizers also may have tackifying properties which add to the rubbery, sticky nature of the resin particles. These plasticizers are selected to be compatible with the resin in the emulsion, and they may be selected from a relatively large group of commercially available materials. Such materials include, but are not limited to, processing oils, liquid polyolefins, ester plasticizers, chlorinated polyhydrocarbons, and low melting resins. The amount of plasticizer required to produce the desired viscosity varies with the particular oily plasticizer chosen, the aqueous emulsion used, and the amount of wood particles in the composition. Typically the amount can range from about 0.10 to about 1.0 times the weight of the emulsion used in the formation, the preferred range is about 0.2 to about 0.4 times the weight of the aqueous emulsion. Examples of suitable naphtahlenic, paraffenic and aromatic processing oils by trademark names are NECTON 60, FAMAX 58, CORAY 80, SUNOIL 2280 and SUNDEX 53. Also suitable are viscous liquids generally regarded as plasticizers in the elastomer art, such as polychlorinated polyphenols known under the trademark names AROCHLOR 1254 and AROCHLOR 1263 and the ester plasticizers for example dioctylphthalate, butyl oleate and liquid wood resins. The liquid grades of polyolefins, especially polymers of the $C_3$ and $C_4$ olefins, such as for example, polybutenes, polyisobutylenes, and polyproplylenes are suitable as low volatile-plasticizers. Particularly preferred is a medium molecular weight, low viscosity, non-volatile polymeric plasticizer designed for plasticizing acrylic resins, known by the trademark name PARAPLEX WP-1. This material boils at a temperature above about 300° C. at atmospheric pressure and is used in the preferred weight ratio range disclosed hereinabove, more preferably at a weight of about one-fourth that of the weight of the aqueous emulsion which is used.

The oily plasticizers used in this invention are preferably added after the wood particles are aqueous emulsion are combined. This order of addition is not essential, but it improves production as described previously. Prior to addition of the oily plasticizer, the viscosity of the composition is relatively thin and it can be easily poured. Upon addition of the oily plasticizer, and after appropriate mixing, viscosity increases to the point where the mixture is no longer pourable at room temperature and has a viscosity of about 5000 poise. At this viscosity the caulk composition becomes gunnable, i.e., capable of extrusion using a caulking gun, and it may also be worked with tools such as a trowel or putty knife as is often necessitated when caulking is performed. While greater viscosity is not inconsistent with extrusion from a caulking gun, lower viscosity can produce flowability which is not desired in a caulk. On the other hand application by trowel or by brush can be carried out at a viscosity of 2800 poise to about 10,000 poise, preferably below 6000 poise, while caulks have a viscosity of 3500 poise to 10,000 poise, preferably 5000 to 7000 poise. These viscosities are measured in a Brookfield viscometer at 25° C.

When an internally plasticized latex is used, such as Rohm & Haas Company product RHOPLEX LC-67, then a thickener such as hydroxyethyl cellulose can be used to increase viscosity.

In addition to the three components (pretreated wood particles, emulsion of film-forming coalescable resin particles and plasticizer) other ingredients may be added to the caulk compositions for known purposes, e.g., to assist in dispersing the wood particles therein, to provide added tack or lubricity, or for biocidal or fungicidal purpose. These added ingredients are not essential for forming the compositions of this invention.

The textured finish is the result of simple drying of the wood particle-containing latex and is obtained even when the latex is smoothly applied. However, the textured appearance can be enhanced, if desired, by utilizing a configurated brush or trowel with a serrated edge.

While the wood filler can be used as the only filler, it is sometimes desirable, especially for paint utilization, to include more conventional pigmentation. Using titanium dioxide as a preferred pigment, one can include from 5 to 100 pounds of titanium dioxide per 100 gallons of the final latex. One can also include extenders, such as silica, calcium carbonate, talc or clay, in an amount of from 25 to 200 pounds thereof per 100 gallons of final latex. These pigments and extenders are simply stirred into the latex in order to incorporate them.

Particularly when the latices are not significantly pigmented so that the wood particles are particularly visible, stains may be used to accentuate the wood appearance. These stains may be incorporated into the latex; or the wood particles can be prestained or stained after the latex has been applied.

The trowellable mixtures can be formulated herein can be used for diverse purposes. Thus, when trowelled over a concrete or plywood surface as a "stucco" the mixture covers the holes or other defects in the concrete or the knots in the plywood. Indeed, one can trowel over ordinary "stucco" and thus repair a damaged stucco surface. These trowellable mixtures are much less dense than the inorganic mixtures usually used, and hence they hold more easily to vertical surfaces, and can even be used on ceilings.

When the latex composition is used as a caulk, then greater viscosity can be tolerated, but when the composition is applied by brush, it will be thinned to reduce its viscosity. Viscosity reduction is carred out by adding water. This effectively increases the proportion of resin emulsion, and it reduces the solids content of that emulsion which can now be as low as about 35%.

BEST MODE FOR CARRYING OUT THE INVENTION

The invention is illustrated by, but not limited to the following example:

EXAMPLE I

Viscosity Stable, Stainable, Latex Caulk Composition

| Components | FORMULA Percent by Weight |
|---|---|
| (1) Wood flour (about 140–600 micron particles | 17.3 |
| (2) Mineral spirits (boiling range about 130° C. to about 200° C.) | 12.1 |
| (3) Aqueous emulsion (RHOPLES LC-40) | 52.1 |
| (4) TRITON X-405[1] | 1.4 |
| (5) CALGON T[2] | 1.5 |
| (6) PARAPLEX WP-1[3] | 14.5 |
| (7) TAMOL 850 (30%)[4] | 0.1 |
| (8) DOWICIL 75[5] | 0.1 |

Note 1 - Nonylphenol condensed with about 40 moles of ethylene oxide, available from Rohm & Haas Co.
Note 2 - Sodium-zinc phosphate glass composition in powdered form used as a dispersant, available from Merck & Co.
Note 3 - Medium molecular weight, low viscosity, non-volatile, polymeric plasticizer for acrylic polymers, available from Rohm & Haas Co.
Note 4 - A low-foaming dispersant for solid materials in acrylic emulsion systems and is available from Rohm & Haas Co.
Note 5 - A biocidal compound used for retarding the growth of mold and mildew, available from Dow Chemical Co.

Component 1 is added to an appropriately sized vessel equipped with a mechanical stirring apparatus, and component 2 is added thereto and mixed therewith until all of component 2 is added and a dry appearing, free-flowing powder results. Component 3 is then added with stirring to the above mixture and once all is added the resultant admixture which is a latex filled with pretreated wood flour is mixed further for about 10 minutes or until a uniform dispersion is created. Component 4 is then added and the resultant admixture mixed for about another 10 minutes. Component 5 is added and mixed similarly. Component 6 is added and as it becomes mixed into the admixture, the viscosity increases and mixing is continued until a high viscosity, non-pourable mass of about 5000 poise viscosity is produced. Component 7 is then added and the resulting mass mixed again for 10 minutes. Component 8 is added last and the whole mixture is then mixed for 30 minutes at which time it is placed into tubes for use with caulking guns.

INDUSTRIAL APPLICABILITY

Caulk compositions made by the above procedure did not change viscosity appreciably from the time they were made. When gunned between two wooden siding boards, the caulk made by the above method exhibited a wood-like texture, and when stained gave a uniform appearance and color to match that of the adjacent boards.

EXAMPLE II

Example I is repeated by adding 5 gallons of water to 100 gallons of the latex caulk composition of Example I to reduce viscosity and ease application by trowel or very stiff brush. The result is a wood textured paint which is suitable for use as a stucco-like wall paint. The wood particles therein provide a textured appearance and they may be stained before or after applications.

EXAMPLE III

Pigmented Wood Texture Paint

| Lbs. | Gal. | Description |
|---|---|---|
| 116.62 | 14.00 | Water |
| 6.00 | .65 | Anionic dispersant of sodium salt of polymeric carboxylic acid (note 1) |
| 200.00 | 9.06 | Silica extender pigment with a mean particle size of 9.5 (note 2) |
| 100.00 | 3.10 | Chalk resistant exterior grade titanium |

-continued

| Lbs. | Gal. | Description |
|---|---|---|
| | | dioxide (note 3) |
| 2.00 | .26 | Hydrophobic silica defoamer (note 4) |
| Grind. Then add: | | |
| 296.00 | 45.00 | Aqueous emulsion polymer of butyl acrylate, methyl methacrylate and 1% acrylic acid. The butyl acrylate and methyl methacrylate are present in a 2:1 weight ratio. |
| 1.25 | .13 | Formaldehyde release biocidal preservative used for retarding growth of bacteria (note 5) |
| 3.00 | .39 | Hydrophobic silica defoamer of note 4 |
| 49.50 | 6.00 | Solution copolymer of styrene and allyl alcohol containing 6% by weight OH, and esterified with 50% by weight of the copolymer with tall oil fatty acids. The esterification is continued to an acid value of 15 and the product is emulsified in water with a nonionic surfactant [nonyl phenoxy polyethyleneoxy) ethanol (9 moles of ethylene oxide per mole of phenol)] |
| 4.00 | .40 | Non-metallic liquid used to inhibit mildew growth on the film surface (note 6) |
| 7.92 | 1.00 | Coalescent solvent (note 7) |
| Premix - Then add: | | |
| 100.00 | 9.09 | Wood flour |
| 71.50 | 11.00 | Mineral spirits |
| 1057.79 | 100.08 | |

Note 1 - The commercial product Tamol 731 available from Rohm and Haas Company may be used.
Note 2 - The commercial product 1240 Silica available from Illinois Minerals may be used.
Note 3 - The commercial product R-960 28 available from DuPont may be used.
Note 4 - The commercial product L-475 available from Drew Chemicals may be used.
Note 5 - The commercial product Nuosept 95 available from Tennaco may be used.
Note 6 - The commercial product Troysan KK-108 available from Troy Chemical Company may be used.
Note 7 - The commercial product Texanol available from Eastman Chemicals may be used.

This pigmented paint has a viscosity of 130 Kreb units (5800 poise) and is particularly adapted for brush application.

What is claimed is:

1. A viscosity stable, stainable, wood textured, aqueous latex composition comprising from 5% to 30% of the weight of the composition of wood particles having sorbed therein a water immiscible organic solvent in an amount of at least about 60% of the weight of the wood to provide a free-flowing, solvent-wet powder, an aqueous emulsion of film-forming plasticized resin particles coalescable at room temperature or below; said emulsion constituting about 35% to about 70% by weight of the composition, the proportion of wood particles, the resin solids content of said aqueous emulsion and the plasticization of the resin particles providing a viscous mass, and said organic solvent providing viscosity stability.

2. The composition as recited in claim 1 wherein organic solvent is an aliphatic hydrocarbon solvent.

3. The composition recited in claim 2 wherein said solvent is selected from the group consisting of mineral spirits, turpentine and turpentine substitutes.

4. The composition recited in claim 2 wherein said organic solvent has a boiling range of about 130° C., to about 200° C.

5. The composition recited in any one of claims 1–4 wherein said wood particles comprise wood flour.

6. The composition recited in claim 1 wherein wood particles are selected from the group consisting of wood flour, sawdust and mixtures thereof, said sawdust having particles sizes of about 250 to about 2000 microns.

7. The composition recited in any one of claims 1–4 and 6 wherein said aqueous emulsion contains about 35% to about 65% by weight of resin solids.

8. The composition recited in claim 7 wherein an oily plasticizer is relied upon to provide the desired low coalescing temperature and increased viscosity.

9. The composition recited in claim 1 having a viscosity of about 2800 poise to about 6000 poise.

* * * * *